United States Patent [19]

Winemiller

[11] Patent Number: 5,461,230
[45] Date of Patent: Oct. 24, 1995

[54] METHOD AND APPARATUS FOR TEMPERATURE COMPENSATION OF GAMMA TOOLS IN MWD ENVIRONMENTS

[75] Inventor: Elton D. Winemiller, Katy, Tex.

[73] Assignee: Halliburton Company, Duncan, Okla.

[21] Appl. No.: 291,294

[22] Filed: Aug. 16, 1994

[51] Int. Cl.$^6$ ............................ G01V 5/04; G01V 5/00
[52] U.S. Cl. ............................... 250/261; 250/262
[58] Field of Search ........................... 250/261, 262, 250/264, 252.1 R, 361, 256, 370.11, 390.11

[56] References Cited

U.S. PATENT DOCUMENTS

| | | | |
|---|---|---|---|
| 3,916,685 | 11/1975 | Paap et al. | 250/262 |
| 4,220,851 | 9/1980 | Whatley | 250/252.1 |
| 4,346,590 | 8/1982 | Brown | 250/256 |
| 5,272,336 | 12/1993 | Moake | 250/261 |

*Primary Examiner*—Davis L. Willis
*Assistant Examiner*—Richard Hanig
*Attorney, Agent, or Firm*—Arnold, White & Durkee

[57] ABSTRACT

A method and apparatus for providing temperature compensation in gamma radiation detectors used in measurement-while-drilling applications in oil and gas exploration. During the initial calibration of a gamma radiation detector, a source of radiation in the form of Americium 241 provides gamma radiation narrowly centered at 60 KeV. The variation in the output signal of the detector as a function of temperature is then determined by placing the detector in close proximity to the radiation source while monitoring the variation in the magnitude of the output pulses as a function of temperature. The detector includes a temperature compensation circuit that generates a threshold voltage whose magnitude corresponds to the desired threshold energy of gamma radiation. The temperature compensation circuit uses a temperature sensor to vary the magnitude of the threshold voltage as a function of the operating temperature of the detector. The variation in the threshold voltage compensates for attenuation of the high frequency output signal of the detector as a function of the operating temperature by comparing the magnitude of the threshold voltage with the magnitude of a filtered output signal. A high count signal is produced whenever the energy level of the detected gamma radiation is equal to or greater than the threshold energy value. The high count signal indicates to other circuitry that the detected gamma radiation is to be counted.

14 Claims, 6 Drawing Sheets

Fig. 2
(PRIOR ART)
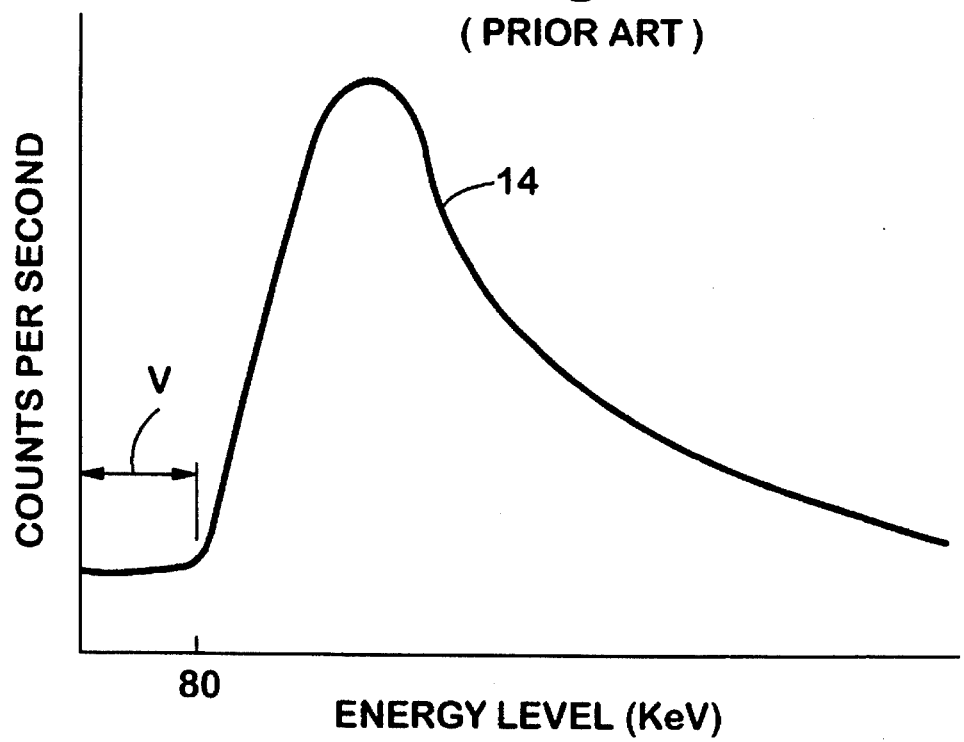
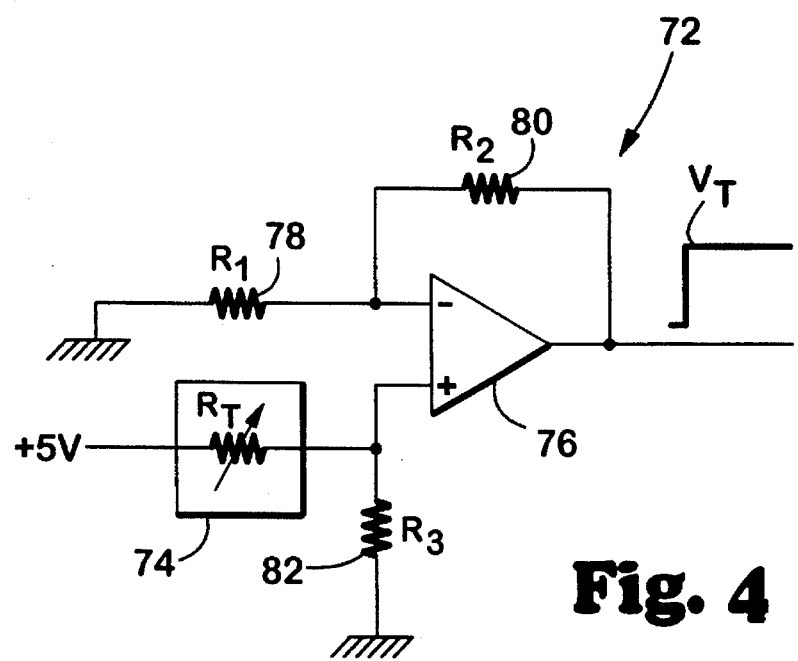
Fig. 4

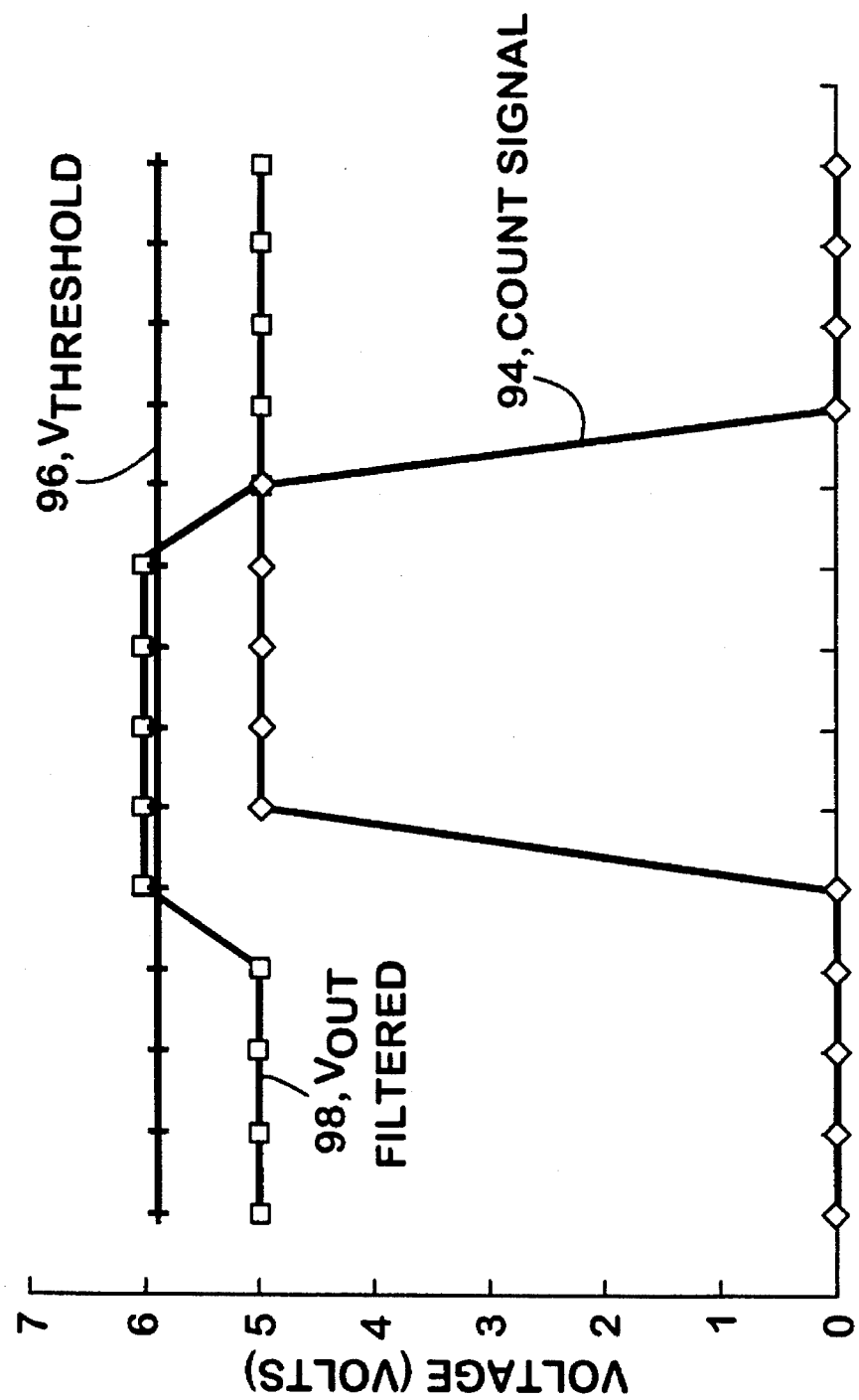

METHOD AND APPARATUS FOR TEMPERATURE COMPENSATION OF GAMMA TOOLS IN MWD ENVIRONMENTS

BACKGROUND OF THE INVENTION

1. Field of the invention

This invention relates to the field of measurement systems utilized by the oil and gas industries.

2. The Prior Art

It is well known that logging tools and measurement-while-drilling (MWD) tools, which make measurements while traversing deep well boreholes, encounter large variations in borehole temperatures. In general, temperatures increase with depth, and very high temperatures are frequently encountered.

Many types of logging tools and several types of MWD tools contain scintillation detectors for measuring gamma radiation. Scintillation detectors incorporate a scintillator (crystal) for converting gamma rays or charged particles to light, photomultiplier tubes for converting the light to electronic signals, and electronics for processing the electronic signals. Although all of these detector components are subject to variation with temperature, the present state of the art of electronics is such that the electronics can be designed to be relatively insensitive to temperature within the desired operating range. However, the crystal and photomultiplier tubes are not insensitive to temperature variations; the result being large fluctuations in the detector response.

BRIEF DESCRIPTION OF THE DRAWINGS

The foregoing and other advantages of the invention will become apparent upon reading the following detailed description and upon reference to the drawings in which:

FIG. 2 is a graphical illustration of the typical background radiation spectrum for a cased well borehole.

FIG. 4 is a schematic diagram of the threshold voltage generation circuit that generates a threshold voltage signal whose magnitude varies as a function of temperature.

FIG. 9 is a graphical illustration of the relationship between the count signal and the threshold voltage and the filtered output signal of the scintillator and the photomultiplier tubes.

Figure 1:
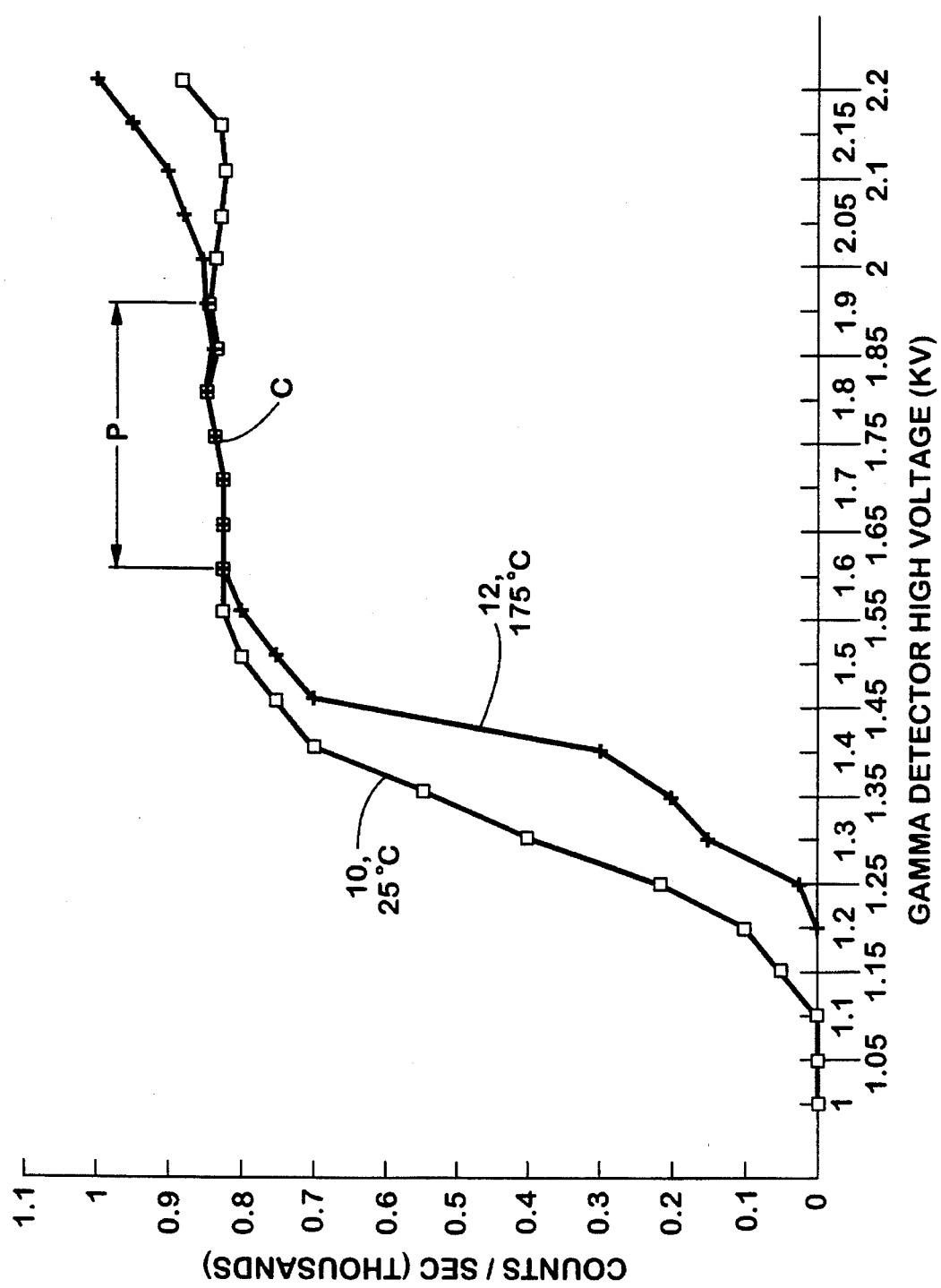
FIG. 1 is a graphical illustration of the prior art use of plateau curves in the determination of the threshold voltage for gamma tools.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DETAILED DESCRIPTION OF THE INVENTION

Turning now to the drawings and referring initially to FIG. 1, in most gamma tools a plateau curve 10 is generated during the initial calibration of the gamma tool to set the threshold energy level at which gamma radiation will be counted. The plateau curve 10 is generated by placing a source of gamma radiation such as Cesium 137, or even no source at all (relying solely upon the background radiation in the downhole region), near the scintillator and photomultiplier tubes. Using an arbitrary threshold setting, the detector's high voltage power supply is then incrementally raised to a higher voltage. The counts above the threshold level are then recorded at each increment until a plateau P is evident. In normal operation the detector's high voltage power supply is then set at the center C of the plateau. The goal being to set the high voltage in the plateau region P where the count rate does not change significantly with changes in the high voltage.

When using gamma tools at elevated temperatures, the plateau curve 10 is generated at 25° C., and then another plateau curve 12 is generated at an elevated temperature, normally greater than 150° C. A midpoint in the combination of the plateaus is then selected to set the threshold of the scintillator and the photomultiplier tubes so as to minimize the impact of fluctuations in the system's high voltage. The scintillator and photomultiplier tubes would then be placed in a thermal insulating flask during MWD operations to insulate them from the operating temperatures in the downhole environment.

The prior art solution to overcoming variations in the output signal of the scintillator and photomultiplier tubes as a function of temperature however has numerous drawbacks.

The first drawback is due to the ambiguity in finding the midpoint of the plateaus. In actual practice, the variation in the threshold energy level can vary as much as 60 KeV from tool to tool. As a rule of thumb, a 10 KeV error in the threshold energy level results in at least a 1% count rate error in operation. This error is further only applicable to energy levels below around 80 KeV due to the sharp attenuation of gamma radiation below that energy level by the well casing materials. As illustrated in FIG. 2 by the curve 14, the energy region V below 80 KeV is often referred to as the valley region of the background spectrum. Therefore in practice much higher errors are often encountered.

The second drawback: to generate the plateau curves, the electronics must be adjusted outside the typical operating range. For example, to determine the noise edge, or far right portion, of the plateau curve, the high voltage power supply must be increased hundreds of volts above the nominal value, and, in some cases, it may exceed the maximum operating voltage of the photomultiplier tubes. Also, other errors such as corona, often appear at such high voltages. Corona is a low level arc that increases as the output of the high voltage power supply increases. It results in a plateau curve that is smaller than normal, further distorting the determination of the threshold level.

A third drawback is that when using a plateau curve to set the threshold level, the threshold is actually set at an undetermined energy level. For example, in a typical gamma tool, when the scintillator and photomuliplier tubes reaches a temperature of 175° C., the scintillamr and photomultiplier tubes gain typically drops by a factor of three. This attenuation of the output signal of the scintillator and photomultiplier tubes effectively raises the threshold energy level by a factor of three. For a typical gamma tool, if the threshold energy level was set at 40 KeV at 25° C., then at 175° C., due to a 3X attenuation, the threshold energy level would be at 120 KeV. Even using the rule of thumb of a 1% count rate error per 10 KeV shift, this would give a count rate error of 8%. However, since the threshold energy level at elevated temperatures is no longer in the valley region of the background spectrum, the resulting count rate errors can approach as much as 30%.

Finally, in MWD applications, the use of a thermal insulating flask to minimize the temperature variations of the scintillator and photomultiplier tubes, and thereby the attenuation of the output signal, creates serious problems due to the flask's size (diameter) and fragility.

The present invention overcomes or minimizes these problems of the prior art by utilizing: (i) an initial calibration procedure whereby the threshold energy level is always set at 60 KeV; (ii) signal processing circuitry that uses a temperature sensor and generates a threshold voltage signal, corresponding to the threshold energy level, whose magnitude varies as a function of temperature; and (iii) signal processing circuitry that compares the magnitude of the threshold voltage signal with the magnitude of a filtered form of the output signal from the scintillator and photomultiplier tubes and generates a count signal indicating the presence or absence of gamma radiation at or above the threshold level. In this manner, the present invention provides a constant threshold energy level over the range of operating temperatures commonly encountered in the MWD operating environment.

A preferred method and apparatus for providing temperature compensation in gamma radiation detectors used in MWD applications are described. The method and apparatus are particularly useful for reducing errors due to attenuation in the output signal of the scintillator and photomultiplier tubes caused by variations in operating temperature. In particular, the preferred embodiment provides a constant threshold energy level up to an operating temperature of 175° C. and eliminates the need for insulative thermal flasks which are highly impractical for MWD applications.

In typical MWD operations, in a manner well known in the art, the pulses of the count selected for counting are grouped into windows according to magnitude (and hence energy), and the number of pulses in each energy window for a particular time interval is determined. However, as the temperature of the gamma detection unit changes, so do the magnitudes of the pulses of the output signal. The present invention corrects for this by utilizing a threshold voltage signal $V_T$, corresponding to the predetermined threshold energy level, whose magnitude also varies as a function of temperature such that the threshold energy level of gamma radiation remains constant despite variations in the magnitude of the output signal of the photomultiplier tube with variations in temperature.

Figure 3:
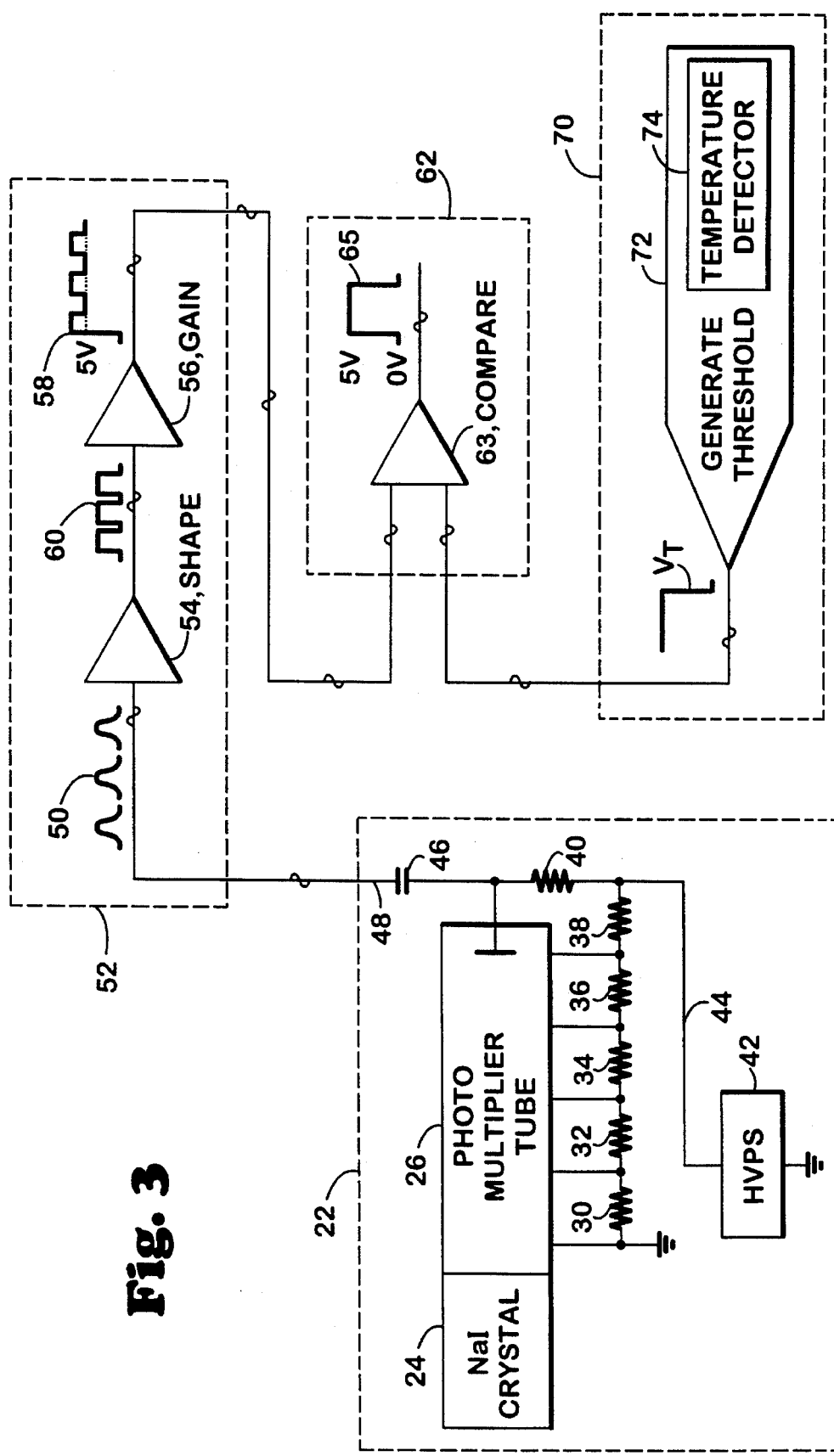
FIG. 3 is a schematic diagram of a temperature compensated gamma radiation detector.

A presently preferred embodiment of the invented apparatus is used advantageously in a well logging tool used in MWD applications where the operating temperature of the gamma radiation detector within the borehole can vary from 25° C. to 175° C. A temperature compensated gamma radiation detector 20 is illustrated in FIG. 3.

The detector 20 includes a gamma detection unit 22 and is of known construction and utilizes a detector which is responsive to the scintillations resulting from formation irradiation. It is possible to use a geiger tube, but the preferred form of detector is a NaI crystal 24. It is positioned immediately adjacent and in operative relationship to a photomultiplier tube 26. The photomultiplier tube 26 has been partially illustrated to include the anode 28. It is constructed with a number of intermediate taps connected to a string of series resistors 30, 32, 34, 36, 38, and 40. The cathode (not shown) is connected to the most negative voltage point. A high voltage power supply (HVPS) 42 is incorporated to provide the appropriate voltage for operation of the photomultiplier tube 26. The negative side of the HVPS 42 is grounded and has an output conductor 44 coupled to the resistor string. The HVPS 42 is typically maintained at a selected voltage with respect to the cathode.

Operation of the photomultiplier tube 26 in conjunction with the crystal 24 occurs in the following manner. Radiation is detected by the crystal 24, and is converted into several photons of light. These photons are observed by the photomultiplier tube 26. The photomultiplier tube 26 is constructed with a series of intermediate dynodes (not shown) functioning in a well known manner to provide amplification. The multiple dynodes are connected to the resistor string.

Typical operation involves placing the cathode at ground level with a high voltage blocking capacitor 46 placed in the output signal conducting path 48 of the gamma detection unit 22. The resulting output signal 50 of the photomultiplier tube 26 typically consists of high frequency pulses of variable magnitude and width.

The output signal 50 is filtered by the filtering circuit 52 to produce a filtered output signal 58. The filtering circuit employs a shaping circuit 54 and a gain circuit 56. The shaping circuit 54 modifies the shape and adjusts the magnitude of the output signal 50 to produce high frequency pulses 60. In a preferred embodiment, the shaping circuit 54 employs successive integration steps (using operational amplifiers with scaling components) to produce the high frequency pulses 60 that closely approximate a square wave. The magnitude of the resulting high frequency pulses 60 are directly proportional to the energy level of the gamma radiation. The gain circuit 56 then adds a 5 volt D.C. component to the high frequency pulses 60 to produce the final filtered output signal 58.

A comparison circuit 62 compares the filtered output signal 58 with a threshold voltage signal $V_T$ to produce a count pulse 65 having a magnitude of 5 volts whenever the magnitude of the filtered output signal 58 exceeds the magnitude of the threshold voltage signal $V_T$. The comparison circuit 62 preferably employs a dual comparator utilizing an operational amplifier 63. The comparison circuit outputs a count signal 65.

The threshold voltage signal $V_T$ is generated by a temperature compensation circuit 70. The temperature compensation circuit 70 utilizes a threshold voltage generation circuit 72 including a temperature detector 74.

Referring now to FIG. 4, the operation and construction of the temperature compensation circuit 70 will now be described. A conventional operational amplifier 76 is utilized as a difference amplifier to produce the threshold voltage signal $V_T$ at its output. Resistors 78, 80, and 82 are fixed at values $R_1$, $R_2$, and $R_3$, respectively. The temperature detector 74 provides a resistance $R_T$ which varies as a function of temperature. The operation of such a difference amplifier is well known, and the threshold voltage signal $V_T$ produced by such a circuit is given by the following expression:

$$V_T = 5 \ (R_3/(R_3+R_T))(1+(R_2/R_1))$$

In a preferred embodiment, the resistance $R_T$ of the temperature detector 74 increases with increasing temperature causing the magnitude of the threshold voltage signal $V_T$ to decrease with increasing temperature. The variation in the threshold voltage signal $V_T$ can thus compensate for attenuation in the output signal 50 of the photomultiplier tube 26.

The particular component values for $R_1$, $R_2$, $R_3$, and $R_T$, as well as the required scaling components (not illustrated) in the shaping circuit 54, will be a function of the threshold energy level chosen for gamma radiation for the particular detector 20. In the preferred embodiment, the required scaling components in the shaping circuit 54 are selected in a known manner to provide high frequency pulses 60 having a magnitude of 1 volt at 25° C. for gamma radiation at the threshold energy level. This will provide a filtered output signal 58 with a maximum magnitude of 6 volts for gamma radiation at the threshold level at 25° C. In corresponding fashion, in the preferred embodiment, the particular component values for $R_1$, $R_2$, $R_3$, and $R_T$ are selected to ensure a threshold voltage signal $V_T$ having a magnitude that is some small value (preferably around 50 mV) less than 6 volts at 25° C. to ensure a high count signal 65 for gamma radiation at the threshold energy level. The particular component values will thus be determined by performing an initial calibration of the gamma detection unit 22.

The detector 20 produces the count signal 65 having a magnitude of 5 volts (TTL level) whenever the energy level of the gamma radiation that impinges upon the crystal 24 is at or above a predetermined threshold energy level for the temperature compensated gamma radiation detector 20. The count signal 65 is then utilized in a well known manner to trigger other detection circuits to count the output signal 58 whenever the count signal 65 has a magnitude of 5 volts.

Figure 5:
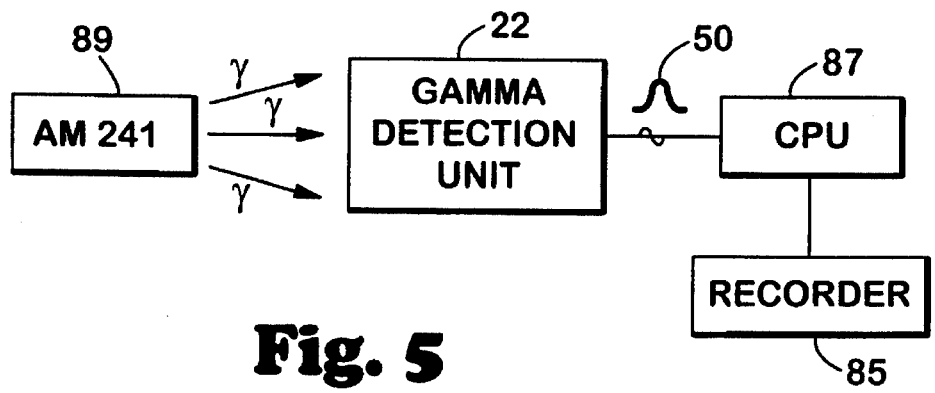
FIG. 5 is a schematic diagram of the initial calibration of a gamma detection unit using an Am 241 source.
Figure 6:
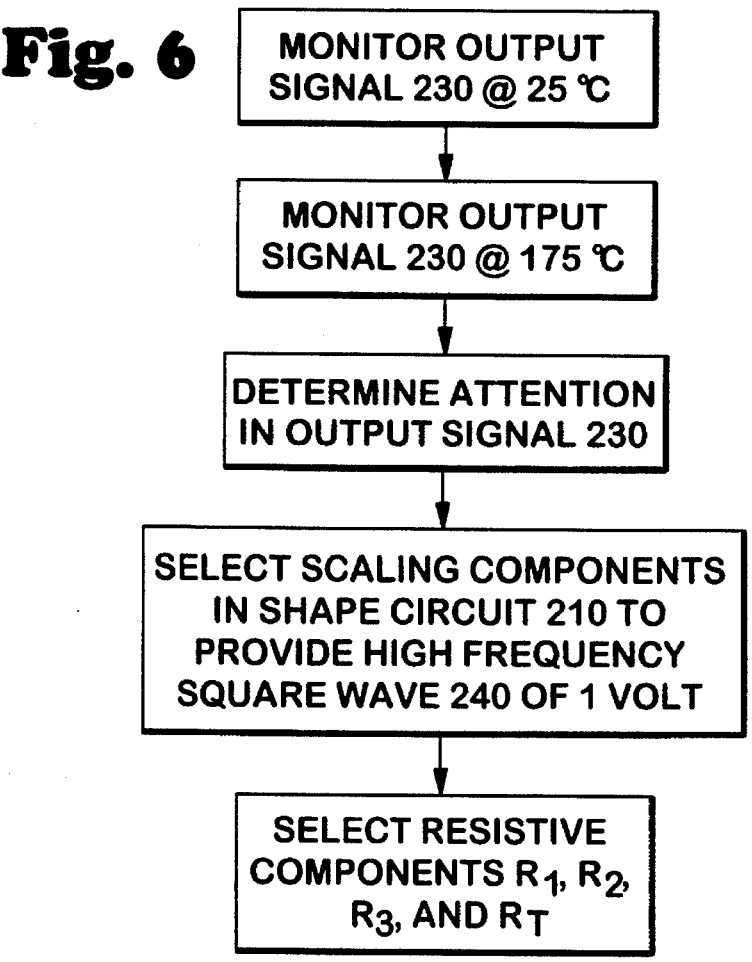
FIG. 6 is a block diagram of the steps taken during the initial calibration of a gamma detection unit.

Referring now to FIGS. 5 and 6, the initial calibration of the gamma detection unit 22 will be described. A source of gamma radiation 89, preferably in the form of Americium 241, is placed in close proximity to the gamma detection unit 22. Am 241 provides gamma radiation having an energy level narrowly centered at 60 KeV. This is especially advantageous for logging tools employed in cased well boreholes since the casing materials sharply attenuate gamma radiation below about 80 KeV. The output signal 50 is monitored using a conventional central processing unit 87 and a recorder 85. The variation in the magnitude of the output signal 50 as a function of temperature is then determined by monitoring the output signal 50 at room temperature, typically 25° C., and then monitoring the output signal 50 at an elevated temperature, typically 175° C.

The measured values for the magnitude of the output signal 50 over the range of temperatures are then utilized to select the required scaling components in the shaping circuit 54 to provide high frequency pulses 60 having a magnitude of 1 volt at 25° C. This will result in high frequency pulses 60 having a magnitude significantly less than 1 volt at 175° C. For the typical gamma tool, there will be about a 3X reduction in magnitude resulting in a magnitude of the high frequency pulses 60 of about 0.33 volts at 175° C. The resulting filtered output signal 58 will have a magnitude varying between 5 and 6 volts at 25° C., and a magnitude varying between 5 and 5.33 volts at 175° C.

The resistive components of the threshold voltage generation circuit 72 are then selected to provide a threshold voltage signal $V_T$ having a magnitude that is approximately equal to the magnitude of the resulting filtered output signal 58 over the range of temperatures.

A specific gamma detection unit 22 will now be discussed to illustrate the selection of the particular components, in particular the resistive components $R_1$, $R_2$, $R_3$, and the temperature detector 74 containing $R_T$.

Using a HGNC logging tool, Model No. NCC167001, available from Halliburton Logging Services Co. of Houston, Tex., for a 60 KeV gamma radiation source of Am 241, the following measurements were made during an initial calibration:

| Temperature | Magnitude of Output Signal 58 |
|---|---|
| 25° C. | 1 V |
| 175° C. | .33 V |

For this typical gamma detection unit 22, there was an attenuation of 3X for an increase in operating temperature from 25° C. to 175° C. Of course, the degree of attenuation will obviously vary with the particular gamma tools in use.

The scaling components of the shaping circuit 54 were then selected to provide a magnitude of 1 volt in the high frequency pulses 60 at 25° C. This resulted in a magnitude of 0.33 volts in the high frequency pulses 60 at 175° C. The magnitude of the resulting filtered output signal 58 ranged from 5 to 6 volts at 25° C., and from 5 to 5.33 volts at 175° C. The particular component values for the scaling components will obviously vary as a function of the particular model of detection unit chosen and as a function of normal manufacturing tolerances.

The resistive components, $R_1$, $R_2$, $R_3$, and $R_T$ of the threshold voltage generation circuit 72 were then selected to ensure a high count signal 65 over the range of operating temperatures from 25° C. to 175° C. whenever the magnitude of the filtered output signal 58 indicated the presence of gamma radiation having an energy level at or above the selected threshold level (in this case 60 KeV).

For the typical gamma detection unit 22, the following values were selected for resistive components $R_1$, $R_2$, and $R_3$:

| Component | Value |
|---|---|
| $R_1$ | 26.5 KΩ |
| $R_2$ | 10 KΩ |
| $R_3$ | 12.4 KΩ |

Figure 7:
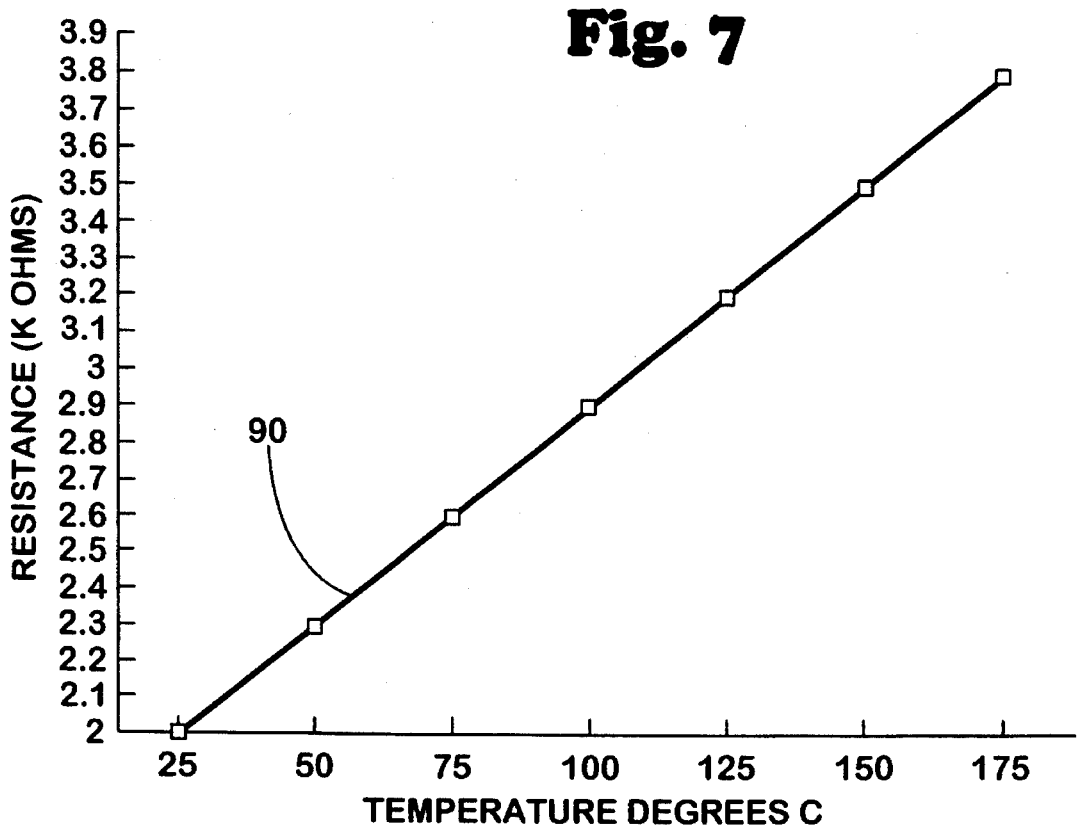
FIG. 7 is a graphical illustration of the variation of the resistance of $R_T$ of the temperature detector as a function of temperature.

Referring now to FIG. 7, the resistance of $R_T$, as a function of temperature, for the temperature detector 74 is illustrated by the curve 90 for the range of operating temperatures from 25° C. to 175° C. The variable resistance $R_T$ ranged from a value of 2 KΩ to 3.83 KΩ for the range of temperatures. The particular temperature detector chosen was a temperature detector, catalog no. ATB204X, available from the RCD Corporation of Manchester, N.H.

Figure 8:
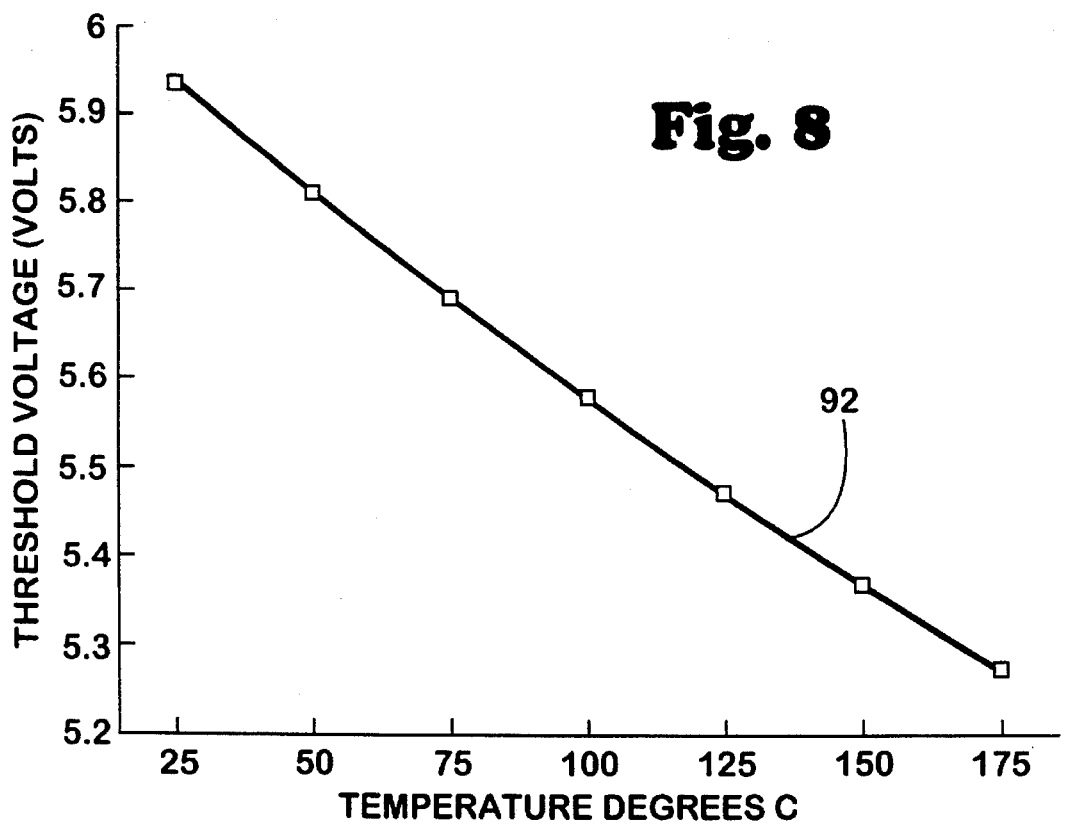
FIG. 8 is a graphical illustration of the variation of the magnitude of the threshold voltage signal $V_T$ as a function of temperature.

Referring now to FIG. 8, the resulting threshold voltage signal $V_T$ for the same range of temperatures is illustrated by the curve 92 for the gamma detection unit 22. The particular resistive components $R_1$, $R_2$, $R_3$, and $R_T$ chosen resulted in a threshold voltage signal $V_T$ that ranged from a value of 5.93 to 5.27 volts over the range of temperatures. Thus, the particular components selected provided a margin between the filtered output signal 58 and the threshold voltage signal $V_T$ of 70 mV to 60 mV over the range of temperatures. This illustrates that the particular component values chosen will also be a function of the manufacturing tolerances of the resistive elements.

Referring now to FIG. 9, the resulting count signal 65 is illustrated by the curve 94 as a function of the threshold voltage signal $V_T$ (curve 96) and the filtered output signal 58 (curve 98) for the typical gamma detection unit 22 at a temperature of 25° C. The count signal 65 is high (5 volt TTL level) for gamma radiation equal to or above the chosen threshold energy level (in this case 60 KeV).

Application of the present invention to a typical gamma detection unit further provides the following benefits. First, the threshold energy level is preferably always set at 60 KeV. This produces repeatability in the response of one gamma tool to the next. Further, it completely alleviates the ambiguity of the threshold setting which was always present with the use of plateau curve calibrations. Second, during the initial calibration procedure, all of the normal electronic circuitry associated with the photomultiplier tubes are heated. This permits compensating for changes in high voltage and pre-amp gain as well as the photomultiplier tubes at elevated temperatures. Third, since the threshold energy level of 60 KeV remains virtually constant with increasing temperature, count rate errors of only ±1% can be achieved in normal operations. This is due to the fact that the threshold energy level is set in the so-called valley region of the background radiation spectrum. Fourth, the electronics are only operated in the nominal operating range for which they were designed. Finally, the need for a thermal insulating flask is eliminated.

An apparatus and method for providing temperature compensation in gamma radiation detectors has been described for use in oil and gas exploration. The method an apparatus provide a constant threshold energy level over the range of typically encountered operating temperatures in the downhole environment. The apparatus and method eliminate sources of significant error which would otherwise result due to attenuation in the output signal of the photomultiplier tubes.

What is claimed is:

1. A radiation detection tool comprising:
   a radiation detector producing an output signal in response to radiation impinging upon said radiation detector;
   a threshold generation circuit producing a threshold signal having a magnitude correlative to a preselected threshold radiation, said threshold signal changing in magnitude over a preselected temperature range corresponding to the temperature of said radiation detector; and
   a comparison circuit receiving said output signal and said threshold signal, comparing said output signal with said threshold signal, and producing a count signal in response to said output signal being greater in magnitude than said threshold signal.

2. The radiation detection tool, as set forth in claim 1, wherein said radiation detector comprises:
   a crystal producing a number of scintillations in response to radiation impinging upon said crystal; and
   a photomultipier tube being positioned proximate said crystal to receive said scintillations, said photomultiplier tube producing said output signal, said output signal having a magnitude correlative to said number of scintillations produced by said crystal.

3. The radiation detection tool, as set forth in claim 2, wherein said radiation detector further comprises:
   means for filtering said output signal.

4. The radiation detection tool, as set forth in claim 3, wherein said filtering means comprises:
   means for shaping said output signal; and
   means for amplifying said output signal.

5. The radiation detection tool, as set forth in claim 1, wherein said threshold generation circuit comprises:
   a difference amplifier, said difference amplifier receiving a temperature signal having a magnitude correlative to the temperature of said radiation detector and receiving a first signal having a magnitude correlative to a radiation level threshold at a first preselected temperature, said difference amplifier producing said threshold signal correlative to a difference between said magnitude of said temperature signal and said magnitude of said first signal.

6. A radiation detection tool comprising:
   a radiation detector producing an output signal in response to radiation impinging upon said radiation detector;
   a filtering circuit being coupled to receive said output signal and producing a filtered output signal;
   a threshold generation circuit producing a threshold signal having a magnitude correlative to a preselected threshold radiation, said threshold signal changing in magnitude over a preselected temperature range corresponding to the temperature of said radiation detector; and
   a comparison circuit being coupled to receive said filtered output signal and said threshold signal, comparing said filtered output signal with said threshold signal, and producing a count signal in response to said filtered output signal being greater in magnitude than said threshold signal.

7. The radiation detection tool, as set forth in claim 6, wherein said radiation detector comprises:
   a crystal producing a number of scintillations in response to radiation impinging upon said crystal; and
   a photomultipier tube being positioned proximate said crystal to receive said scintillations, said photomultiplier tube producing said output signal, said output signal having a magnitude correlative to said number of scintillations produced by said crystal.

8. The radiation detection tool, as set forth in claim 6, wherein said filtering circuit comprises:
   means for shaping said output signal; and
   means for amplifying said output signal.

9. The radiation detection tool, as set forth in claim 6, wherein said threshold generation circuit comprises:
   a difference amplifier, said difference amplifier receiving a temperature signal having a magnitude correlative to the temperature of said radiation detector and receiving a first signal having a magnitude correlative to a radiation level threshold at a first preselected temperature, said difference amplifier producing said threshold signal correlative to a difference between said magnitude of said temperature signal and said magnitude of said first signal.

10. A radiation detection tool comprising:
   a crystal producing a number of scintillations in response to radiation impinging upon said crystal;
   a photomultipier tube being positioned proximate said crystal to receive said scintillations, said photomultiplier tube producing an output signal having a magnitude correlative to said number of scintillations produced by said crystal;

a temperature detector being positioned proximate said crystal and said photomultiplier tube, said temperature detector producing a temperature signal correlative to detected temperature proximate said crystal and said photomultiplier tube;

a threshold generation circuit being coupled to receive said temperature signal, said threshold generation circuit producing a threshold signal correlative to a preselected threshold radiation at a temperature indicated by said temperature signal; and a comparison circuit receiving said threshold signal and said output signal, comparing said threshold signal with said output signal, and producing a count signal in response to said output signal being greater in magnitude than said threshold signal.

11. The radiation detection tool, as set forth in claim 10, wherein said radiation detector further comprises:

means for filtering said output signal.

12. The radiation detection tool, as set forth in claim 11, wherein said filtering means comprises:

means for shaping said output signal; and means for amplifying said output signal.

13. The radiation detection tool, as set forth in claim 10, wherein said threshold generation circuit comprises:

a difference amplifier, said difference amplifier being coupled to receive said temperature signal and being coupled to receive a first signal having a magnitude correlative to a radiation level threshold at a first preselected temperature, said difference amplifier producing said threshold signal correlative to a difference between said magnitude of said temperature signal and said magnitude of said first signal.

14. A method of compensating for temperature changes experienced by a radiation detection tool, said method comprising:

placing a radiation detector in a given environment and producing a radiation signal having a magnitude correlative to radiation in said environment;

sensing a temperature of said environment and producing a temperature signal having a magnitude correlative to the temperature of said environment;

producing a radiation threshold signal having a magnitude correlative to said magnitude of said temperature signal; and producing a count signal in response to said radiation signal being greater than said radiation threshold signal.

* * * * *